United States Patent [19]
Haugsjaa et al.

[11] 3,890,511
[45] June 17, 1975

[54] ELECTRET PULSE GENERATOR

[75] Inventors: Paul O. Haugsjaa, Acton; Daniel C. Casella, Hamilton, both of Mass.

[73] Assignee: GTE Laboratories Incorporated, Waltham, Mass.

[22] Filed: Apr. 15, 1974

[21] Appl. No.: 460,848

[52] U.S. Cl. ...... 307/106; 178/DIG. 10; 179/111 E; 307/88 ET; 340/265 C
[51] Int. Cl. ............................................. H03k 3/00
[58] Field of Search..... 307/106, 88 ET; 340/365 C; 178/DIG. 10; 179/111 E

[56] References Cited
UNITED STATES PATENTS

| | | | |
|---|---|---|---|
| 3,449,094 | 1/1969 | Baxt et al. | 307/88 ET |
| 3,612,778 | 10/1971 | Murphy | 307/88 ET |
| 3,786,495 | 1/1974 | Spence | 307/88 ET |
| 3,809,828 | 5/1974 | Haugssaa | 307/88 ET |

Primary Examiner—David Smith, Jr.
Attorney, Agent, or Firm—Irving M. Kriesgman

[57] ABSTRACT

An apparatus is described wherein a multi-layered structure utilizing a plurality of electret assemblies provides an electrical pulse in response to a mechanical force. In one form the electret apparatus includes a plurality of spaced electrically connected conductors and electret assemblies movably mounted between the conductors. The electret assemblies are urged against one side of the conductors which then are exposed to an electric field which is reversed when the electret assemblies are driven to the other side of the conductors under a mechanical force to generate an electrical pulse. In another embodiment a spiral electret structure is formed with spring stock conductors. When the spiral structure is wound tight and then suddenly released, an electrical pulse of energy is produced.

15 Claims, 10 Drawing Figures

PATENTED JUN 17 1975 3,890,511

SHEET 1

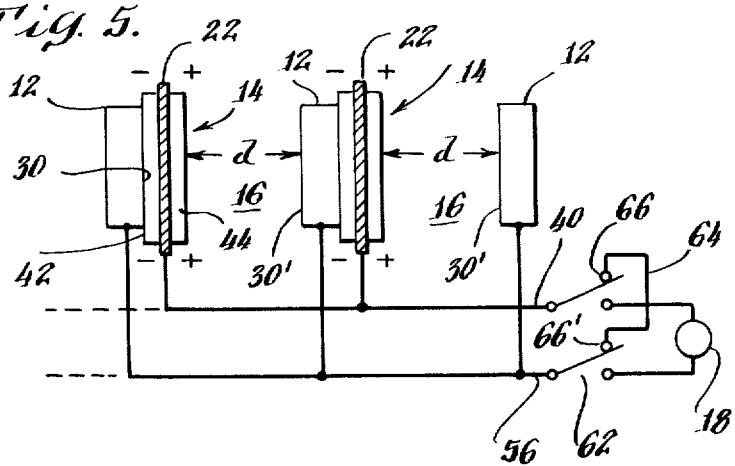
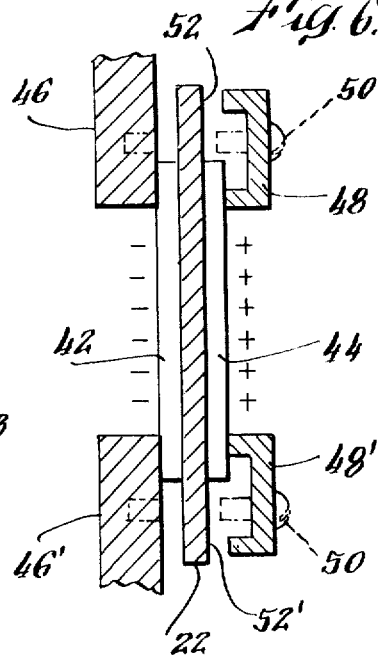
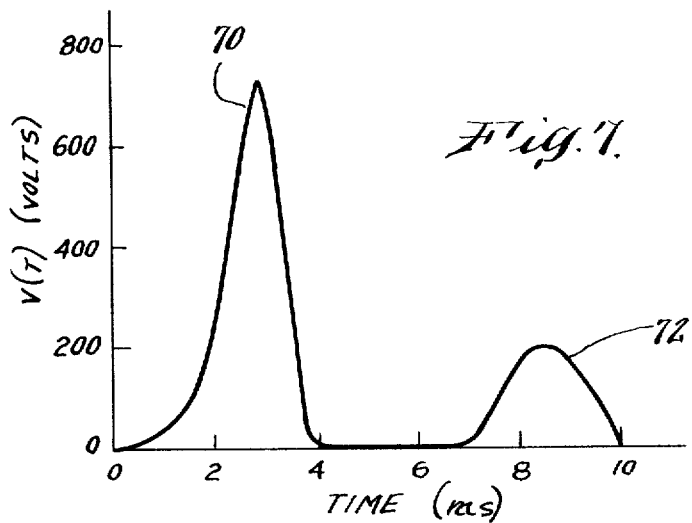
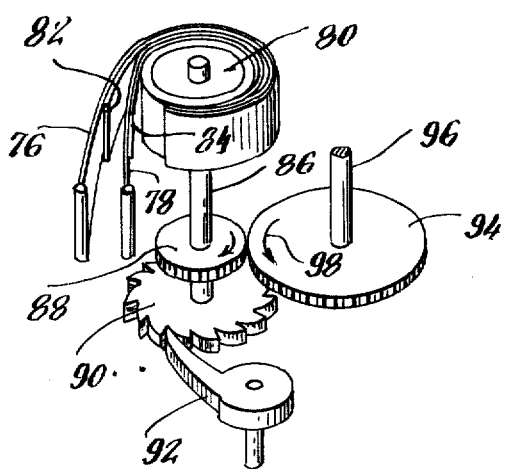
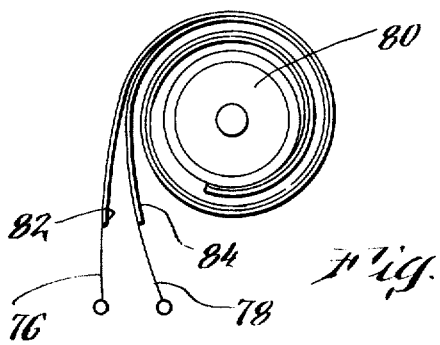

3,890,511

ELECTRET PULSE GENERATOR

This invention relates to an electrical pulse generating device using an electret. More specifically, this invention relates to a device utilizing an electret to produce an electrical pulse for the ignition of a photo-flash lamp.

BACKGROUND OF THE INVENTION

An electret is a dielectric body which is provided with a volume of surface electric charge. The electret dielectric body retains the electric charge for very long times, often measured in tens of years. The electric charge, or the dielectric polarization, as it is often called, is achieved in one process by heating a body of dielectric material to a relatively high temperature while the material is exposed to an intense electric field for a substantial time and then cooling the material while maintaining its exposure to the electric field. Upon cooling, the material exhibits characteristics of a permanent charge distribution.

Electrets have many uses such as a transducer as described in the U.S. Pat. No. 1,804,364 to Parker as well as others as mentioned in various publications related to electrets. Note, for example, the description of electrets in the Journal of Applied Physics Vol. 40 No. 8 of July 1969 in an article by J. Roos entitled "Electrets, Semi-Permanently Charged Capacitors"; the article in Product Engineering of Feb. 10, 1969 starting at page 62 in an article entitled "Electrets Get New Look As Design Uses Emerge". Of interest in this latter article is the reference made to a printed book available from the Electrochemical Society of 30 East 42nd Street, New York, N.Y. 10017 entitled "Electrets". Many other publications related to electrets also are available in the art.

Electrets are dielectrics which produce a static electric field having a relatively long lifetime. Their long life is mainly attributable to the development of new materials which are much more stable than the earlier employed waxes. Today, hydrophobic materials such as fluoronated hydrocarbon polymers are extensively used to form electrets.

Electrets may be made to have a net single sign of charge (known as a mono-charge electret) instead of a dipole charge. One method for making this mono-charge type electret is by bombarding a polymer in a vacuum with a beam of electrons. The electrons become permanently entrapped near the surface of the polymer, thus giving the film polymer a negative mono-charge.

SUMMARY OF THE INVENTION

In an electrical pulse generating device in accordance with the invention, an apparatus is formed utilizing a multi-layer structure formed with electrets interposed between conductors for their exposure to an electret produced electric field. A mechanical force is applied to the structure to, in effect, rapidly remove the electric field by separating the conductors and thus create an electrical pulse.

In one embodiment described herein in accordance with the invention, a plurality of electret structures are mounted between conductive plates in a manner enabling a rapid movement of the electret structures to achieve a desired electrical pulse.

In another form of the invention, a spiral structure is proposed wherein an electret and associated conductors are formed into a spiral. The conductors are made of spring stock which, after being wound into a spiral, can be suddenly released to produce an electrical pulse.

The electrical pulses from the electret pulse generator have been found sufficient to ignite a photo-flash lamp for use in photography. The electret may be reused many times and last for extended time periods to provide an advantageous approach for igniting a photo-flash lamp.

It is, therefore, an object of the invention to provide a convenient electrical pulse generating electret structure that may be reused many times with mechanical actuation.

It is a further object of the invention to provide a photo-flash lamp igniter utilizing an electret structure with mechanical actuation.

BRIEF DESCRIPTION OF DRAWINGS

These and other objects and advantages of the electret pulse generating device in accordance with the invention can be understood with reference to the following detailed description of several embodiments described in conjunction with the drawings wherein

FIG. 5 is an electrical schematic representation of the electret pulse generator shown in FIG. 1;

FIG. 6 is a representation of the electret structure employed in the pulse generator of FIG. 1;

FIG. 7 is a timing diagram illustrating a pulse produced with an electret generator as shown in FIG. 1;

FIG. 8 is a perspective view of a spiral electret pulse generator in accordance with the invention;

FIG. 9 is a top view of the spiral electret pulse generator in accordance with the invention; and FIG. 10 is an enlarged partial schematic representation of the spiral electret pulse generator shown in FIG. 8.

DETAILED DESCRIPTION OF EMBODIMENTS

Figure 1:
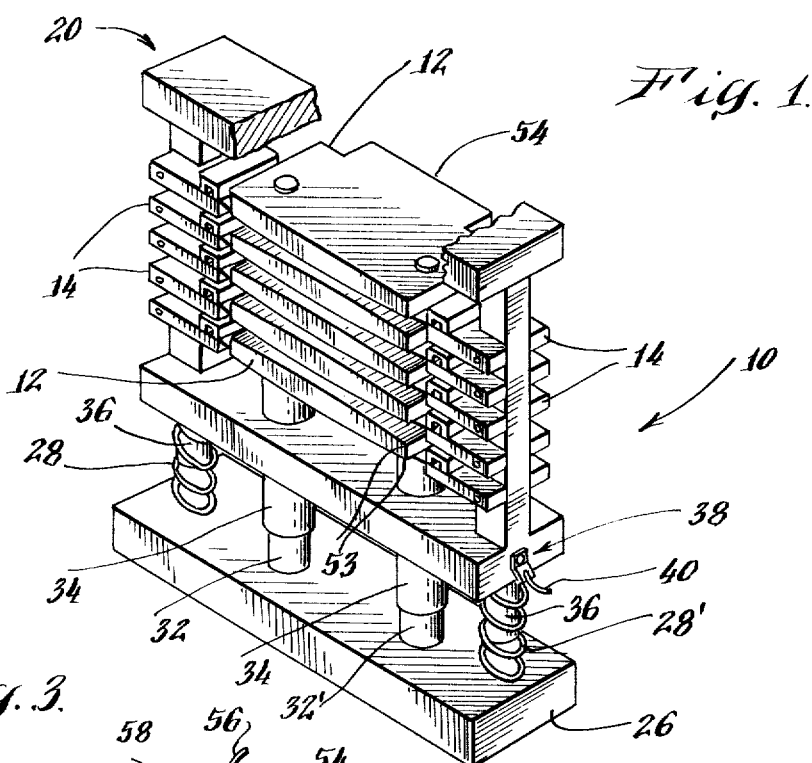
FIG. 1 is a perspective view of an electret pulse generator in accordance with the invention.
Figure 3:
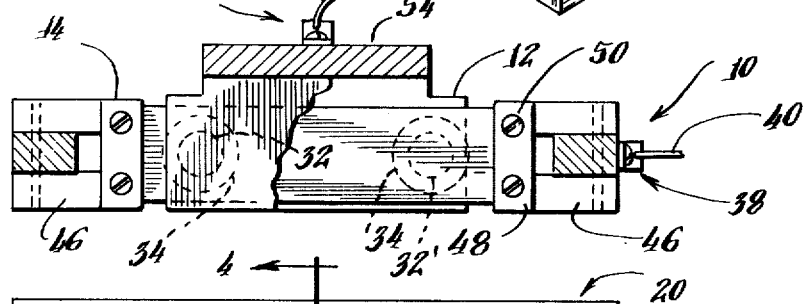
FIG. 3 is a section view of the electret pulse generator as shown in FIG. 2 and taken along the lines 3—3 in FIG. 2.

With reference to FIGS. 1 through 4, an electret pulse generator 10 is shown. The pulse generator 10 is formed of a multi-layered structure composed of a plurality of electrically connected conductor elements 12 spaced from each other to enable a plurality of electret assemblies 14 to move in the spaces 16 for contact with the conductors 12. The electret pulse generator 10 is capable of delivering sufficient electrical energy in a short instant of time to flash a photo-flash lamp 18 (see FIG. 5).

The electret pulse generator 10 is formed with a movable electret structure 20 formed of a plurality of vertically stacked electret assemblies 14 spaced from each other to fit in the spaces 16 between the conductors 12. Each of the electret assemblies has an electrical conductor 22 (see FIG. 6) which is electrically connected to a conductive frame 24. Frame 24, in turn, is mounted for vertical movement with respect to a stationary insulator base 26. Frame 24 is spring mounted with springs 28–28' which normally urge the electret assemblies into contact with the lower surfaces 30 of conductor elements 12.

The frame 24 may reciprocate vertically under guidance by a pair of electrically insulated guide posts 32–32' which are attached to base 26. Posts 32 extend upwardly to contact lower conductor 12 and thus capture the frame 24. Sleeves 34 are employed for enhanced vertical guidance of the frame 24 along posts 32. Springs 28 are anchored to frame 24 with studs 36 which extend partially into the central recess of the spiral springs 28. An electrical contact is established with a screw and clip assembly 38 electrically connected to a wire 40 and frame 24.

Each electret assembly 14 as shown in FIG. 6 is formed of a central conductive foil 22 in contact with a pair of electret strips 42, 44. Contact may be established with a suitable adhesive or merely by placing the electrets 42, 44 in contact with the foil 22 while the electrets and foil are held under tension. The electrets 42, 44 and foil 22 are held to conductor brackets 46–46' with U-shaped clamps 48–48' attached to the brackets with screws 50.

Figure 2:
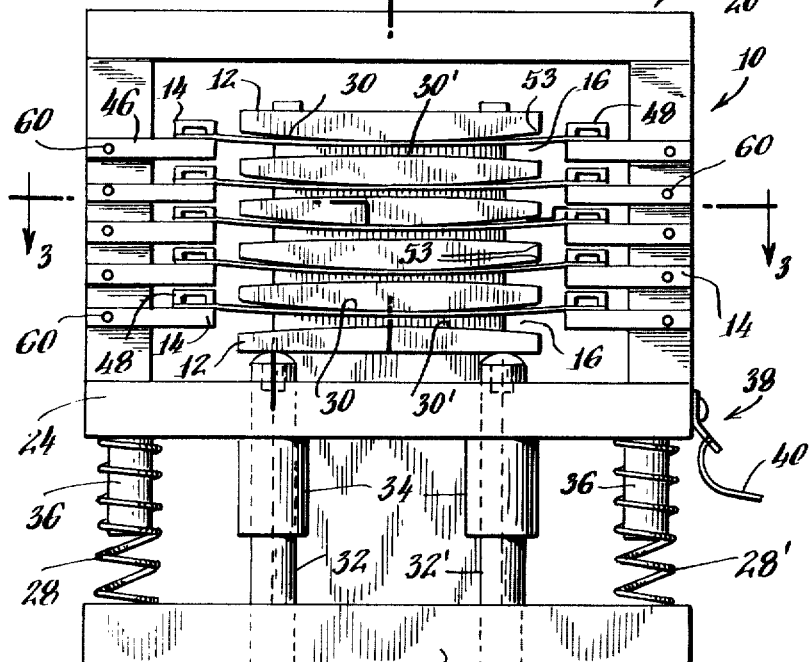
FIG. 2 is a side view in elevation of the electret pulse generator as shown in FIG. 1.
Figure 4:
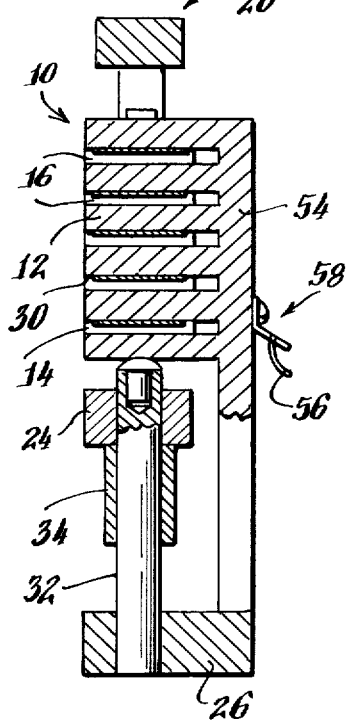
FIG. 4 is a section view of the electret pulse generator as shown in FIG. 2 and taken along the lines 4—4 thereon.

FIG. 6 shows the electrets 42, 44 and foil 22 in exaggerated size for illustrative purposes. Actually, the electrets are each of the order of about one mil thick and the foil several mils thick. Accordingly, clamps 48 will firmly mount to brackets 46 as shown in the view of FIG. 2 with the ends 52–52' of foil 22 firmly clamped for retention and electrical contact to the brackets 46.

The electrets 42, 44 are of the dipole type with a negative charge on one side and a relatively positive charge on the opposite side. The electrets are mounted such that one electret 42 has its negative side facing outwardly and the other, 44, has its positive side facing out. The net charge then resulting on the foil 22 is approximately neutral.

The electrets employed may be of a variety of materials such as TEFLON of ½ mil thickness with surface potentials of the order of about 500 volts. Other materials may be employed such as ACLAR with a surface potential of the order of 1200 volts and as manufactured by the Thermo Electron Corporation by a corona discharge method.

Since the electret assemblies 14 and frame 24 are urged upwardly by springs 28, the electrets are moved into contact with surfaces 30 of conductors 12. The latter surfaces are curved, as illustrated away from the adjacent electrets, to prevent damage of the thin electret structure from corners such as 53 of conductors 12. The opposite surfaces 30' of conductors 12 are similarly curved.

The conductors 12 are connected to each other with a conductive bracket 54 mounted on insulative base 26. Bracket 54 is mounted vertically to enable conductors 12 to extend horizontally after attachment to bracket 54 with suitable screws (not shown). A conductor lead 56 is electrically coupled to bracket 54 with a lug and screw assembly 58.

Electric energy is obtained from the electret pulse generator 10 by electrically connecting the foils 22 between electrets 42, 44 to conductive frame 24 with screws or rivets 60. The leads 40 and 56 then provide electrical connection to the structure for use as shown in FIG. 5. The schematic presentation in FIG. 5 illustrates the partial pulse generating structure. Leads 40, 56 are coupled through a two position switch 62 to a photo-flash lamp 18. The switch 62 is shown in its normal position with leads 40, 56 being short circuited by a lead 64 connected to contacts 66–66'. Similarly, the electret assemblies 14 are shown in their normal positions against surfaces 30 of conductors 12.

In the position of the components as illustrated in FIG. 5, the potential of conductors 12 relative to electrodes 22 is positive since the negative surface of electret 42 induces a positive charge. The net charge on the foil electrodes 22 itself is neutral. As this charge distribution becomes stabilized, i.e. in a very short time, the switch 62 is actuated and the electret pulse generator electrically placed across photo-flash lamp 18.

Thereupon, a downwardly directed impact force is imparted to the frame 24, causing the electret assemblies 14 to move across the spaces 16 to surfaces 30' of conductors 12. When the positive surface potential of electrets 44 contacts surfaces 30' of conductors 12, a charge reversal is induced, forcing a redistribution of electrons and delivering a voltage pulse 70 (see FIG. 7) to flash lamp 18.

The voltage pulse 70 includes sufficient electrical energy to ignite photo-flash lamp 18. After the ignition has occurred, the electret assemblies 14 return to their normal positions as shown in FIGS. 2 and 5 to rebuild the normal charge distribution after switch 62 reestablishes an electrical short between electrical leads 40, 56.

In some actuations, a second pulse 72 may be produced as a result of the bouncing of the frame 24. The second pulse 72, however, is of insufficient magnitude to provide a second flash. The distance $d$ which the electret assemblies 14 must travel is selected sufficiently short to result in a high magnitude pulse 70. Yet the distance $d$ is sufficiently great to cause an adequate electric field reversal. Generally the distance $d$ is selected at least ten times the thickness of the electrets 42 and 44.

Another embodiment for an electret pulse generator is shown in FIGS. 8, 9 and 10 wherein a spiral electret 74 is employed. A pair of spring-stock strips 76–78 are wound into a spiral on an insulator cylinder 80. A pair of electret strips 82, 84 are respectively attached to corresponding sides of spring strips 76, 78 with the polarities of the electrets 82, 84 as illustrated in FIG. 10. This places conductor 78 adjacent negative sides of electrets 82 and 84, thus inducing a positive charge relative to conductor strips 76.

Cylinder 80 is connected to a shaft 86 which is coupled to a drive gear 88 and a ratchet wheel 90 engaged by a pawl 92. Gear 88, in turn, is coupled to a wind-up gear 94 having a shaft 96. A connecting switch and photo-flash lamp as shown in FIG. 5 have been deleted for clarity.

When the wind-up gear is rotated in the direction of arrow 98, the springs 76, 78 are wound into a tight spiral. As the spiral contracts, the conductors 76, 78 establish a charge distribution with conductor 78 being positive with respect to conductor 76 with the conductors connected to electrical circuit as shown in FIG. 5. In other words, the conductors 76, 78 are initially shorted and after spiral contraction and before release coupled across a photo-flash lamp. When the pawl is released, such as by actuation of the shutter control on a camera, the spiral rapidly expands. This causes the electrically charged conductors 76, 78 to separate, doing work against the previously established electrical fields. The result is a conversion of the mechanical force stored in the wound spring structure into an electrical energy-pulse for igniting a flash lamp or the like. Note that one of the electrets 82 or 84 may be replaced with a dielectric layer sufficient to electrically separate conductors 76 and 78.

Having thus described an electret pulse generator in accordance with the invention, its many advantages can be appreciated. A multi-layered electret structure may be formed to convert a mechanical force into an electrical pulse of sufficient energy to ignite a photo-flash lamp.

What is claimed is:

1. An apparatus for generating a pulse of electrical energy from a mechanical force comprising
   a multi-layered structure formed of a first conductor and a second conductor with an electret therebetween, said first conductor being formed with a multiple of spaced elements which are electrically connected to each other with the electret located between the elements;
   the second conductor being mounted in proximity with the electret at an electrically opposite side thereof in comparison with the electret side on which the first conductor elements are located to form different electrical charge polarities between the first and the second conductors;
   said first and second conductors being mounted for relative movement with respect to each other to generate an electrical pulse when the first and second conductors are rapidly separated under action from said mechanical force.

2. The electrical pulse generator as claimed in claim 1 wherein the electret and the second conductor are formed into an assembly for joint motion between the spaced elements of the first conductor.

3. The electrical pulse generator as claimed in claim 2 and further including a second electret mounted with the first electret on the second conductor on opposite sides thereof, the first and second electrets being electrically oriented to provide opposite polarities facing outwardly for contact with the first conductor during operative relative movement between the first and second conductors.

4. The electrical pulse generator as claimed in claim 1 wherein the first and second conductors are formed of spring-stock and selectively shaped into a spiral structure insulated from each other with an electret therebetween.

5. The electrical pulse generator as claimed in claim 1 wherein the second conductor and the electret are formed into a plurality of electret assemblies located in the spaces between the first conductor assemblies; and
   a frame for supporting the electret assemblies and mounted to move the electret assemblies into operative contact between the first conductor elements.

6. An electrical pulse generator to ignite a photo-flash lamp comprising
   means for producing a plurality of first conductor elements;
   means for supporting the first conductor elements in spaced relationship with each other and in electrical interconnection;
   a plurality of electret assemblies mounted for movement between the first conductor elements, said electret assemblies being electrically connected to form a second conductor;
   means for normally urging the plurality of electret assemblies against the conductors to establish a normal electric charge pattern between the first conductors and the electret assemblies;
   said normal electret charge pattern being interrupted upon actuation of the electret assemblies to produce an electrical pulse.

7. The electric pulse generator for a photo-flash lamp as claimed in claim 6 wherein each electret assembly is formed of a sandwich structure including a centrally located conductive foil and a pair of dipole charged electrets mounted to the foil and having opposite charge polarities adjacent the foil; and
   means for electrically coupling said foils to each other.

8. The electric pulse generator for a photo-flash lamp as claimed in claim 7 wherein said means includes
   a conductive frame shaped to support the electret assemblies between the first conductors; and
   clamps coupled to the electret assemblies for retention to the frame and electrical connection thereto.

9. The electric pulse generator for a photo-flash lamp as claimed in claim 8 and further including
   means for urging the frame with its electret assemblies towards one side of the first conductors to establish said normal charge pattern.

10. The electric pulse generator for a photo-flash lamp as claimed in claim 9 wherein said urging means includes springs supporting the frame and oriented to bias the frame in a direction which will seat one of the electrets in each of the electret assemblies into contact with a first conductor.

11. The electric pulse generator for a photo-flash lamp as claimed in claim 10 wherein said first conductors have surfaces which are arcuately shaped to avoid sharp corner engagement with an electret during electric pulse generation.

12. An electric pulse generator comprising
    a pair of metal strips formed of a material which exhibits a spring characteristic, said pair of strips being wound into a common spiral shape;
    a pair of dielectric strips located between the pair of metal strips to separate the latter into a first and second conductor;
    at least one of said dielectric strips being formed of an electret material selected to induce a first charge distribution to the first and second conductors when the latter are wound with stored mechanical energy into a tight spiral form to provide an electric pulse from the first and second conductor when their tight spiral shape is released to convert the stored mechanical energy into said electrical pulse.

13. The electrical pulse generator pulse generator as claimed in claim 12 wherein the pair of dielectric strips are each formed of an electret having a dipole charge, each electret being mounted adjacent one of the conductors, with the electrets having surfaces of opposite polarity for contact with the adjacently located conductor.

14. The electrical pulse generator as claimed in claim 13 and further including
    means for winding the first and second conductors into said tight spiral shape.

15. The electrical pulse generator as claimed in claim 14 wherein said electrets are affixed to their respectively adjacent conductors for movement therewith during winding and release of the spiral shape.

* * * * *